United States Patent
Fox et al.

(10) Patent No.: US 12,361,147 B2
(45) Date of Patent: Jul. 15, 2025

(54) SYSTEMS AND METHODS FOR MANAGING DOCUMENT CONTENT ACCESS VIA SECURITY OVER A NETWORK OF NODES

(71) Applicant: Icon Clinical Research Limited, Leopardstown (IE)

(72) Inventors: Ronan Fox, Leopardstown (IE); Sean Kelly, Leopardstown (IE); Thomas O'Leary, Leopardstown (IE); Anthony Clarke, Leopardstown (IE)

(73) Assignee: Icon Clinical Research Limited, Leopardstown (IE)

( * ) Notice: Subject to any disclaimer, the term of this patent is extended or adjusted under 35 U.S.C. 154(b) by 0 days.

(21) Appl. No.: 17/817,713

(22) Filed: Aug. 5, 2022

(65) Prior Publication Data

US 2023/0069361 A1   Mar. 2, 2023

Related U.S. Application Data

(63) Continuation of application No. 16/560,181, filed on Sep. 4, 2019, now abandoned.

(51) Int. Cl.
*H04L 67/104* (2022.01)
*G06F 21/60* (2013.01)
*G06F 21/62* (2013.01)
*H04L 9/40* (2022.01)

(52) U.S. Cl.
CPC ........ *G06F 21/6209* (2013.01); *G06F 21/602* (2013.01); *H04L 63/0428* (2013.01); *H04L 63/083* (2013.01); *H04L 63/101* (2013.01); *H04L 67/104* (2013.01)

(58) Field of Classification Search
CPC . H04L 63/0428; H04L 63/083; H04L 63/101; H04L 67/104; H04L 9/50; H04L 9/3236; H04L 63/0442; G06F 21/6209; G06F 21/602; G06Q 10/103
See application file for complete search history.

(56) References Cited

U.S. PATENT DOCUMENTS

| | | | |
|---|---|---|---|
| 6,252,879 B1 * | 6/2001 | Zhang | H04L 12/4625 709/228 |
| 7,954,135 B2 * | 5/2011 | Simpson | G06F 21/604 709/219 |
| 2018/0101557 A1 * | 4/2018 | Ventura | G06F 16/27 |
| 2018/0260741 A1 * | 9/2018 | Lamoureux | G06Q 30/06 |

* cited by examiner

*Primary Examiner* — Shin-Hon (Eric) Chen
*Assistant Examiner* — Vladimir I Gavrilenko
(74) *Attorney, Agent, or Firm* — Bookoff McAndrews, PLLC

(57) ABSTRACT

A method of managing distribution of a document and access to its contents with security in a network having nodes is described. The nodes may have digital processors for remote communication over a wide area network and local data stores. The exemplary method includes a node sending a document in encrypted format and including a payload, and control data including destination data, access control data, and signature data, and a document destination list. The sending node may only send the document to nodes on the destination list. A node may receive the document, decrypt at least some of the document, and process the document according to the control data by extracting the control data and managing document payload access and document storage and user access according to the control data.

15 Claims, 3 Drawing Sheets

SYSTEMS AND METHODS FOR MANAGING DOCUMENT CONTENT ACCESS VIA SECURITY OVER A NETWORK OF NODES

CROSS-REFERENCE TO RELATED APPLICATION(S)

This patent application is a continuation of and claims the benefit of priority to U.S. Nonprovisional patent application Ser. No. 16/560,181, filed on Sep. 4, 2019, the entirety of which is incorporated herein by reference.

INTRODUCTION

The present disclosure relates to management of distribution and security of documents which have confidential information and which must be signed or approved by a number of geographically spread parties.

Peer-to-peer ("P2P") networks may be provided, in which data is shared between nodes using security such as asymmetric cryptography. Each node may have a local store of documents relevant to workflows and collaborations to which the users have been invited.

The present disclosure is directed towards achieving improved control of distribution and security of such documents.

SUMMARY OF THE DISCLOSURE

The present embodiments describe a method of managing distribution of a document and access to its contents with security in a network comprising nodes with digital processors for remote communication over a wide area network and local data stores, the method being implemented by said processors. The method may comprise steps of:
  a node, acting as a sending node, sending a document in encrypted format into the network and said document including:
    a payload with document content, and
    control data including destination data, an access control rights map, and signature data, and a document destination list, and
    finite state machine FSM executable software code for managing document state.

A node, acting as a receiving node and executing a software client application, may receive the document, decrypt at least some of it, and process the document according to said control data by extracting the control data and managing document payload access and document storage and user access according to the control data.

Also, said software client application may act as a listener for documents directed towards that receiving node, and act as a compiler and executor of the control data embedded within the received document, and/or
  the receiving node software client application may process the control data in a manner transparently to authorised users, and/or
  the receiving node may execute the finite state machine FSM executable software code to allow it and the document to access a current document state, and to enable the document to move through a document-specific set of allowable states.

The receiving node may extract the payload and outputs data to authorised users, by mapping sections of the payload to an access control list (ACL), in which each authorized user participant has access to some or all of the document.

The receiving node may store in an access log of the document a record of authorised user access to the payload.

The control data may include mapped document sections including:
  an interested parties section defining authorised users,
  an access control section defining, for each authorised user, a user identifier and a rights map governing access to the document internal structure,
  an access log section recording historical user access data including identifier of said user and time and nature of each access.

The nodes may perform encryption and decryption using public and private keys in which the public key is used to verify and encrypt and the private key is used to decrypt.

The document may include one or more of:
  network configuration data including destination nodes and optimisation settings relating to network load for distributing the document in an efficient manner,
  an access control list specifying levels of authorisation for recipients of the document,
  an access log which records access to the document, both machine access and human user access,
  payload attributes including one or more of version numbers, checksums, and priorities, and
  signature-relations records includes settings relating to a map of signatures and workflow for a sequence of signatures and verifications to be enforced.

The document may include executable code for dynamic instantiation of the document by the sending node.

The document may be processed by the receiving node as an instantiation of the FSM which understands, through its executable code, a sequence of document-specific allowable states for that document and provides document-specific features for use by the authorized users.

The receiving node may determine a next user according to a next actor in a workflow which may be determined according to a map within the document, and said map may be aligned to the current state of the document as held in the FSM code to ensure that the document goes to the next agreed-upon step in the process.

The document payload may be sent a plurality of times each with a different set of participating parties, and each FSM state in the document may be known ahead of its distribution, and FSM state data may be included in the control data when the document is distributed.

The method may comprise the sending node performing a look-up of an array of participants to determine at document run time.

Said look-up may provide instructions for a level of granularity of controlling interaction of a receiving node with specific parts of a document, according to metadata about the document and its constituent parts.

The document may include semantic definitions of the sections within the document.

The semantic definitions may be expressed as RDF and/or XML/JSON representations. The rights map may be included in an access control list providing a desired fine grained and deep level of control.

The method may comprise allowing an authorized user to sign in with access to one document section, but make no other alterations, or to allow an update to a specific section of the document but not to another section.

The FSM code and the access control data may be dynamically modified to enable intelligent document analysis at run time to determine any shifts in access control requirements over its lifetime, in which the document may have M states and N authorized users who have read/write access. An authorized user may act on the document and move it from a first state to a second state which causes that user to lose write access, but a subsequent state change caused by a second user may cause said first user to re-gain write access.

The FSM executable software code may manage the movement of the document from one document state to another document state by providing standard services to the underlying receiving node processor and the document may allow a consistent approach to state changes across all document types, in which the FSM executable code maintains the state of the document.

Updates to the document may be tracked and controlled by the nodes in a distributed audit trail, while guaranteeing that only those authorized users who have access rights to relevant document sections can interact.

Additional Statements

The present disclosure describes a method of managing distribution of a document and access to its contents with security in a network comprising nodes with digital processors for remote communication over a wide area network and local data stores, the method being implemented by said processors and comprising steps of a node sending a document in encrypted format and including: a payload, and control data including destination data, access control data, and signature data, and a document destination list. The sending node may only send the document to nodes on the destination list. A node may receive the document, decrypt at least some of it, and process the document according to said control data by extracting the control data and managing document payload access and document storage and user access according to the control data.

A dedicated client application on each receiving node may perform said document processing, in which the application may act as a listener for documents directed towards that node, and also act as a compiler and executor of any configuration or code embedded within a received.

The receiving node may process the control data in a manner transparently to the authorised users. The receiving node may extract the payload and outputs to authorised users, by mapping sections of the payload to an access control list (ACL), in which each authorized user participant has access to some or all of the document.

The receiving node may store in an access log of the document, a record of authorised user access to the payload.

The control data may include mapped document sections including:
  an interested parties section defining authorised users,
  an access control section defining, for each authorised user, a user identifier and a rights map governing access to the document internal structure,
  an access log section recording historical user access data including identifier of said user and time and nature of each access.

The nodes may perform encryption and decryption using public and private keys in which the public key is used to verify and encrypt and the private key is used to decrypt.

The receiving node may include a finite state machine (FSM) execution code, and the document may include executable code allowing the document to access an underlying state from the node. The node executable code may be embedded in the node as part of instantiation of a document before it is sent to the receiving node.

The document may include one or more of:
  network configuration data including destination nodes and optimisation settings relating to network load for distributing the document in an efficient manner,
  an access control list specifying levels of authorisation for recipients of the document,
  an access log which records access to the document, both machine access and human user access,
  a payload, and payload attributes including one or more of version numbers, checksums, and priorities, and
  signature-relations records includes settings relating to a map of signatures and workflow for a sequence of signatures and verifications to be enforced.

The document may include executable code for dynamic instantiation of the document.

The receiving node may determine a next user according to a next actor in a workflow which is determined either through a FSM embedded executable code in the node or according to a map within the received document.

The document may be deployed a plurality of times, in which each deployment has a different set of participating parties and each FSM state in the document is known ahead of its distribution and FSM state data is included in the control data when the document is created. When each instance of that document is subsequently deployed, the list of participating parties may change in at least one time that the document is deployed.

The method may comprise performing a look-up of an array of participants to determine at document run time. Said look-up may provide instructions for a level of granularity of controlling interaction of a node with specific parts of a document, according to meta data about the document and its constituent parts.

In various embodiments:
  the document includes semantic definitions of the sections within the document, and/or
  the semantic definitions are expressed as RDF and/or XML/JSON representations; and/or
  the document structure definition is in in fine-grained control of access right as defined in a rights map; and/or
  the rights map is included in an access control list providing a desired fine grained and deep level of control; and/or
  the method comprises allowing a user to sign in one section, but make no other alterations, or to allow an update to a specific part of the document but not to another section; and/or
  the document structure is machine readable to enable intelligent document analysis at run time to determine any shifts in access control requirements over its lifetime.

A network comprising a plurality of nodes with digital data processors and storage may be configured to perform a method of any embodiment.

In another aspect, the present disclosure describes a non-transitory computer storage medium comprising software code for implementing a method of any embodiment when executed by digital data processors.

BRIEF DESCRIPTION OF THE DRAWINGS

The invention will be more clearly understood from the following description of some embodiments thereof, given by way of example only with reference to the accompanying drawings, in which:—

DETAILED DESCRIPTION OF THE DISCLOSURE

The present disclosure describes a method and network for securely distributing documents to remote consumers, along with certifying that the consumers have read those documents (for such things as protocols and standard operating procedures ("SOPs")), and have agreed to the contents within them (as part of a collaborative workflow), or that they have consented to the content using electronic signatures.

The method and network perform such control to, for example, retain the source documents at a particular site (or a location at which they were created). Also, the nodes on a P2P network synchronise to enable centralised data tracking for reporting and compliance enforcement if required. The network may allow data to be stored at multiple locations, giving a distribution of the documents and associated data set between nodes in the network, and also records auditable transactions against those data sets for a recreation of the data set, regulatory reporting, network resilience, and secure distributed storage.

The network described herein may include a development of P2P networks in that, while using much of the technology of a P2P network underlying infrastructure, not all data is shared between all nodes in the network. This is very advantageous for applications such as in management of clinical trials. In the case of a clinical trial application, the network may be used by a sponsor, a contract research organisation ("CRO"), and sites across studies. For specific studies and use cases within the performance of a clinical trial study, different partitions may be created in this described network of the invention to allow the sharing of documents between specific nodes in the network to ensure that those who need access to the data have access, without the overhead of all documents being duplicated across all nodes in the network, when only a very small percentage would need access (given that redundancy would be built in between those nodes that need that access).

Figure 1:
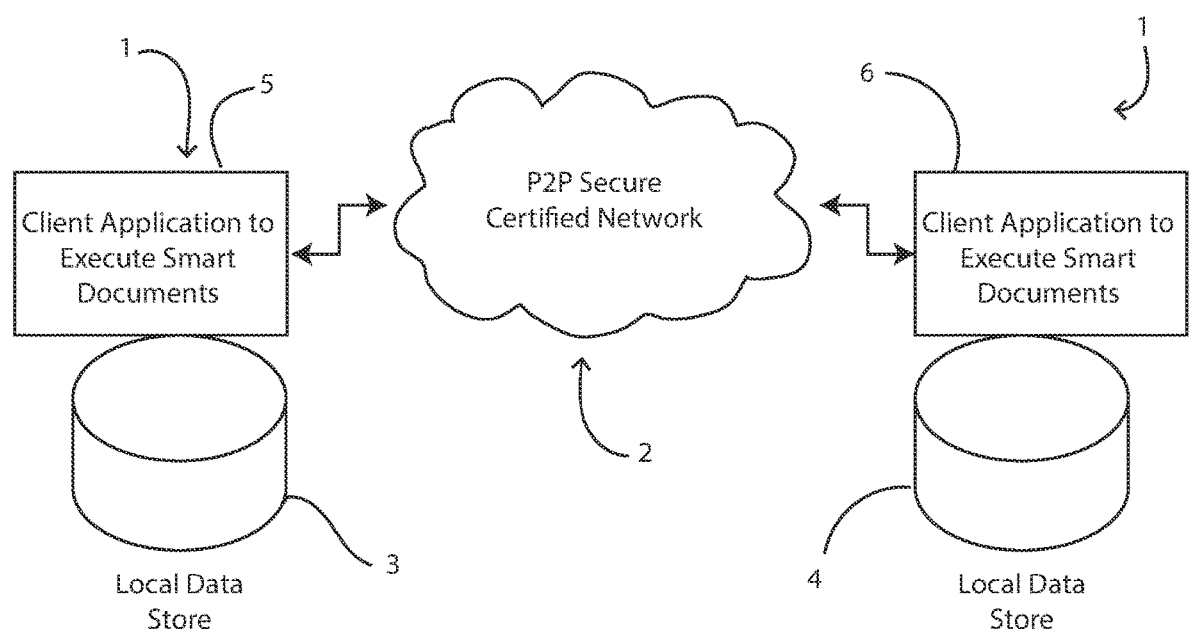
FIG. 1 is a block diagram showing major components of a document management network.

The network topology is shown at a high level in FIG. 1 which represents an embodiment of the main network elements involved in a document exchange at the clinical trial study level. Each node 1 accessing the network 2 and declared to be a member of the network may have a local store 3 and 4 respectively of documents relevant to the workflows and collaborations to which they have been invited. The local document store may be provided by a browser-based HTML 5 document store, or through a larger scale document store dependent on their overall document store requirements. The store (at rest) and all transmissions of data (in flight) on the network may be encrypted. Local clients may only be able to decrypt the data if they are in possession of correct cryptographic keys.

Each node 1 may have a client application 5 and 6, respectively, which acts as a listener for documents directed towards that node when the node is acting as a receiving node, and also acts as a compiler and executor of any configuration or code embedded with the document being distributed. When a first, sending, node pushes a document into the network, this code and configuration may determine the high-level destination nodes to which the document should be distributed.

The document may be sent to all nodes, but only those nodes who need to see it will process it, and these nodes may be referred to as receiving nodes. The FSM software pre-installed on each node may make that determination by analysis of the list of node destinations.

Figure 2:
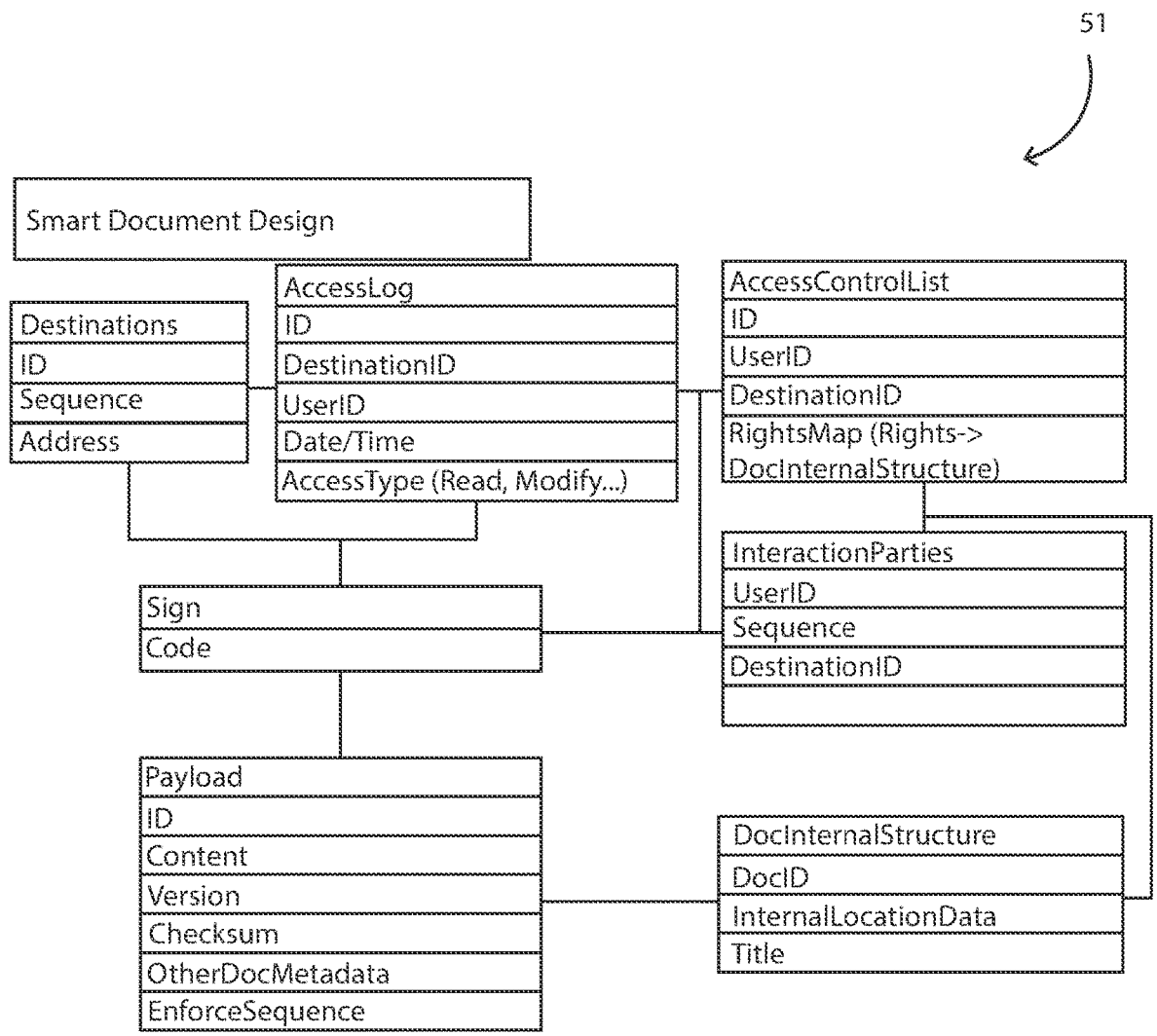
FIG. 2 is a diagram illustrating components of a document.

The client application 5 and client application 6 workflow may execute to unwrap, determine the relevance to the current logged-in user, enable the interaction (sign, edit, acknowledge receipt), and forward the document to the next recipient, as shown in exemplary FIG. 2.

As part of the underlying infrastructure, an encryption mechanism is provided. This may be asymmetric. Some specific examples include Elliptic Curve Cryptography (ECC) and Elliptical Curve Digital Signature Algorithm (ECDSA). Both may be used to validate the origin and integrity of messages.

The basis of signing may be the creation of a public and private key. For example, Ethereum or Bitcoin use the hashed version of the public key to identify an address. The public key may be used to verify and encrypt, and the private key may be used to decrypt.

Setup

Not every member of the network needs access to every document in that network. For example, a patient may not need access to study-specific protocols. So, each document may have a high-level routing table (itself encrypted), indicating to the network which high-level network members should receive the distributed document.

Also, the network may determine elements of a workflow indicating a sequence in which actions need to take place across the network. For example, if a consent form has been distributed to the network and a patient has been included in that distribution, the system may need to control who signs that consent and in which order. The system may prevent an investigator signing until the patient and/or his/her guardian has signed.

A finite state machine (FSM) may be distributed to each node in the P2P network. This may allow the smart document to access the underlying state from the infrastructure rather than implementing the state machine each time a new document is created by users. The FSM may be an engine that is installed on each node which will manage the movement of a smart document from state to state. This FSM engine may provide standard services to the underlying infrastructure and the smart document that will utilise the P2P network, thus simplifying the smart documents themselves and allowing a consistent approach to state changes across all smart document types. The FSM engine may maintain the state of the document. The smart document may then an instantiation of an individual state machine which understands, through its own code, the sequence of document-specific valid states for that document as well as providing document-specific features for use by the participants in the P2P network.

The generic FSM distributed to each node as part of the infrastructure set up might look like the following (as part of the underlying Blockchain or P2P infrastructure):

```
FSM {
    Structure stateFunctions [ ]
    Void updateState( )
        currentState = getCurrentState( )
        Execute (currentState)
    Void removeTopState( )
        stateFunctions.remove( )
    void addState(newState)
```

```
        stateFunctions.add(newState)
    function getCurrentState( )
        return stateFunctions.top( )
}
```

This pseudo code above is an example of a generic state machine, allowing the application domain implement and maintain the allowable set of states and the logical transitions between them. This "application" may be the Smart Document which is distributed to the nodes in a P2P/Blockchain network, given that each node already has the FSM executable code ("brain") in place as part of the infrastructure. Consensus and sequencing can also be leveraged through existing infrastructure in HyperLedger (Burrow and Consensus).

Smart Document

A Smart Document is a document that contains a document or data set and code and configuration data to enable collaboration, distribution and certification within an encrypted P2P network.

An example of a smart document which is capable of executing the workflow shown as part of the architecture and using the node FSM executable code detailed above is detailed below:

```
'Network Configuration
Structure Destinations [ ]
Structure AccessLog [ ]
Structure ACL [ ]
'Document
Structure Payload bytes[ ]
Structure DocInternalStructure[ ]
'Payload Attributes
Version string
Checksum string
'Interaction-Relations
Map InteractionParties bytes[ ][ ]
Boolean EnforceSequence = False
'Instantiation of the document
SmartDocument(Particpants string[ ], EnforceSequence Boolean))
    Copy Particpants into InteractionParties [ ][1]
    Create New FSM( ) 'Creating the "brain"
    Initialise the FSM(signPatient)
Void signPatient(Participant string, Signature bytes[ ])
    performPatientSigningOperation( )
    FSM.removeTopState( )
    FSM.addState(signInvestigator)
Void signInvestigator(Participant string, Signature bytes[ ])
    performInvestigatorSigningOperation( )
    FSM.removeTopState( )
    FSM.addState(makeConsentAvailable)
Void makeConsentAvailable( )
    Publish Consent to Persistent Storage
    Notify InteractionParties
```

The pseudo code above is one example of a "Smart Contract" and how one might be used with the FSM to enable a distributed workflow within the network. For simple interaction workflows, each state in the Smart Document may be known beforehand, including the participating parties. These could be effectively "hard coded" in the document as the document is created and deployed onto the network. In other cases, the document could be generic and created once. Then the document could be deployed several times, with each deployment potentially having a different set of participating parties. In either case each state in the Smart Document may be known ahead of its distribution. The FSM states may be included in the control data when the document is created and when each instance of that document is subsequently deployed. The list of participating parties may, and probably will, change each time the document is deployed.

For example, in the pseudo code shown above, the "performPatientSigningOperation" would check that the node and participant match and can sign the document, based on the current state of the document itself. Further, the "performInvestigatorSigningOperation" would most likely also check that the node and participant match and can sign the document, based on the current state of the document itself—in this case the state of the document must be that the patient has already signed it. In other words the investigator, in this example, could not perform the signing operation until after the patient has signed it.

In the case where participating parties are not known ahead of time, arrays of Participants would be used as a lookup to determine based on the specific scenario (during the individual deployment of the document at run time). Further flexible granularity may also be required where interaction with specific parts of a Smart Document may be controlled, which will require metadata about the document and its constituent parts. This more complete structure is shown in exemplary FIG. 2.

As shown in FIG. 2 a Smart Document 51 includes the following types of data:—

Network configuration may include elements such as the destinations relevant to this document and some optimisation settings relating to network load and getting the documents distributed in the most efficient way (1). Some of this configuration may be used by the underlying P2P network while others may be used by the Smart Document itself.

Access Control List may allow the specification of levels of Authorisation for recipients of the document. The highest level of security may access the complete distributed ledger. Others having less access may only be permitted see what they need to see in the ledger. Thus, the ledger may become secured.

Access Log may record who has read the document, opened, etc. as part of the shared ledger. This may embed the concept of knowing, not alone what machine has received the document, but who has also read it within the ledger.

The Document content—which may be a PDF, document, image, or other form of media Payload attributes may, for example, include version numbers, checksums, priorities, and other elements which can be used by the application user interface and underlying architecture to add value to the business processes built on the document.

Signature-Relations may include settings relating to the map of signatures and other elements relating to workflow where the sequence of signatures/verification is to be enforced.

DocInternalStructure may include semantic definitions of the internal sections within the document. RDF and XML/JSON are representations which could be used. One use of this internal structure definition may be finer grained control of access right as defined in the RightsMap under the AccessControlList. This may allow finer grained and a deeper level of control, thus allowing a user to sign in one section, but make no other alterations, or to allow an update to a specific part of the document but no other. Allowing the document structure to be machine readable may enable intelligent document analysis at run time to determine any shifts in access control requirements over its lifetime, to the point of workflow mutations that could be needed depending on ACL-to-semantic mappings.

Instantiation. Each individual deployed version document and document intelligence may include self-contained explicit code and configuration elements which are compiled and executed by the underlying P2P client software made available either through a light client, browser add-on, or installed software applications. This could be implemented via JavaScript and Node.js, a code generation tool, or a configuration tool, or directly on Blockchain (2)/Ethereum (3). The instantiation may refer to the specific deployment of an instance of the document type into the network. For example, an eConsent document may be designed for a trial (may be regarded as a template). Then that eConsent document may be deployed multiple times—for each combination of investigator/patient and that is what actually is deployed and is signed by each participating party.

Regarding access control by authorized users, the document structure may be machine readable to enable intelligent document analysis at run time to determine any shifts in access control requirements over its lifetime. Access control may change over the lifetime of a document. For example, there may be three states that the document could be in and they are sequentially A, B, C and two authorized users (User1 and User2) who have read/write access at the start. If User 1 acts on the document and moves it from State A to State B, then it could occur that User 1 loses write access. Once User 2 moves the state from State B to State C, then it could arise that User 1 regains write access. These states and access rights could be predetermined, or there could be a more complex sequences of states which, when reached in a specified amount of time or set of states results in different access right being granted to specific users.

Figure 3:
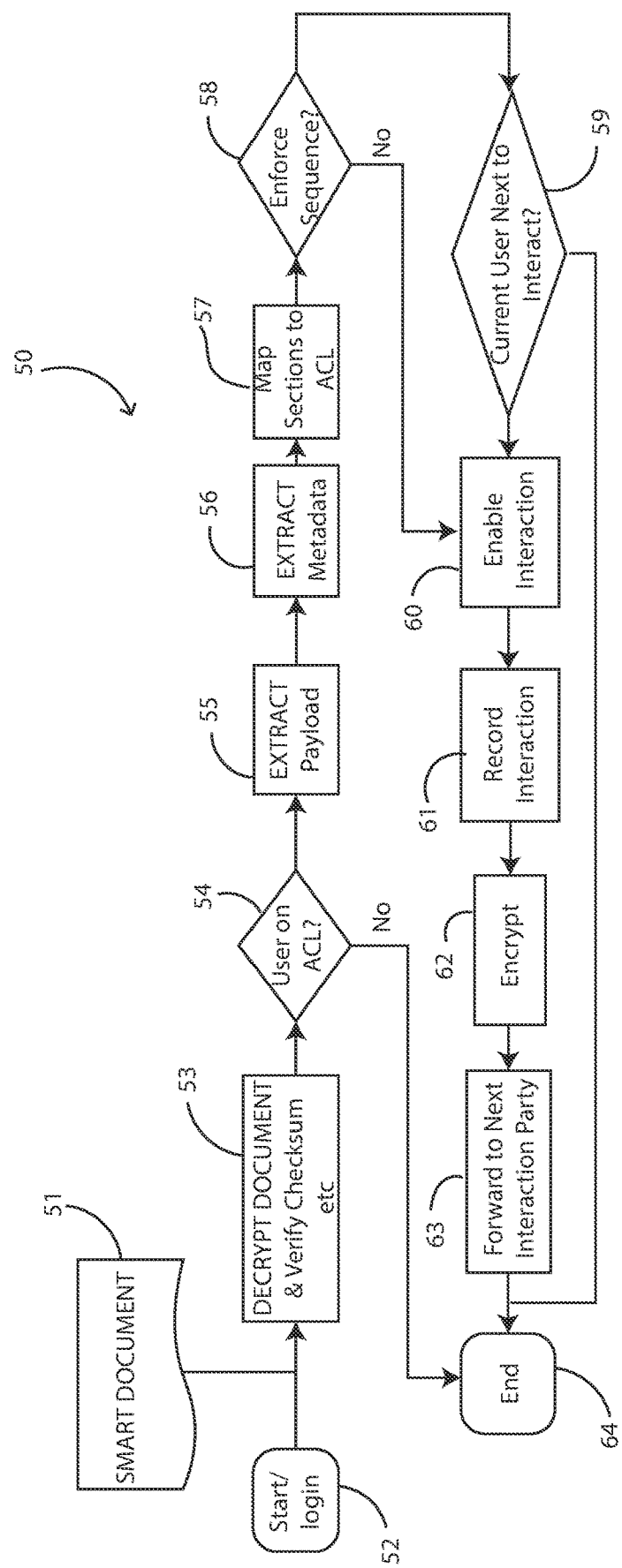
FIG. 3 is a flow diagram illustrating a workflow implemented by the network.

Referring again to FIG. 3, the following are the main steps of a method 50 performed by a client application at a node upon receipt of a smart document 51:

Decrypt document and verify checksum, 52, 53, respectively.

User on Access Control List (ACL)? (54). The application determines if the user has the right to perform this interaction on this part of the document (or the document as a whole)

Extract payload, 55.

Extract metadata, 56.

Map Sections to ACL, 57.

Enforce Sequence (58) using the embedded FSM executable code in the network node 1, 2 in conjunction with the specific Smart Document 51 which includes information as to where it should be routed and what the states mean to the document in terms of the domain requirements, notifications on completion, persistence, and any other relevant activities Current user next to interact, 59. This can be defined as the next actor in a workflow which is determined either through a "hard coded" FSM or one that relies on a more extensible and flexible map of Interaction Parties Enable interaction, 60.

Record interaction, 61.

Encrypt, 62.

Forward to next interaction party, 63 and end 64.0

An example of the DocInternalStructure is laid out below in RDF as an exemplar representation model:

```
<rdf:Description
Rdf:about="http://www.sourcelocation.com/important/DocToSign">
    <document:author>Dr. Principal Investogator</ document:author >
    <document:source>{7892341n-nkmgdfshj-453782p5}
    </ document:author >
<document:sections>
    <rdf:bag>
        <rdf:li rdf:id="123">Understanding a Clinical Trial</rdf:li>
        <rdf:li rdf:id="124">Risks in this Clinical Trial</rdf:li>
        <rdf:li rdf:id="125">Steps in this Clinical Trial</rdf:li>
    </rdf:bag>
    <document:sections>
</rdf:Description>
```

The above document has three sections with ids of "123", "124", and "125" respectively An example of a RightsMap to be used in conjunction with the DocInternalStructure is laid out below:

```
@prefix acl: <http://www.w3.org/ns/auth/acl#> .
@prefix foaf: <http://xmlns.eom/foaf/0.1/> .
<acl:accessTo <DocToSign>; acl:mode acl:Write; acl:agentClass
foaf:PrincipalInvestigator>
<acl:accessTo <DocToSign>; acl:mode acl:Control; acl:agent
<PrincipalInvestigator#999>>
<acl:accessTo <DocToSign>; acl:mode acl:Read; acl:agentClass
foaf:StudyNurse>
<acl:accessTo <DocToSign#123>; acl:mode acl:Sign;
acl:agent<Patient#11>>
<acl:accessTo <DocToSign#124>; acl:mode acl:Sign;
acl:agent<Patient#11>>
<acl:accessTo <DocToSign#125>; acl:mode acl:Sign;
acl:agent<Patient#11>>
```

The above ACL representation shows that any PrincipalInvestigator can write to the document, PrincipalInvestigator #999 can control who has access to the document, and any StudyNurse can read the document. Patient11 can sign the three sections but cannot modify the document.

It will be appreciated that the network may distribute documents to remote consumers, and that it may provide a mechanism to manage protocol and SOP distribution. It may also provide for collaborative editing and updating of joint documents. All edits and updates to the document may be tracked and controlled through the use of the distributed audit trail, while guaranteeing that only those who have access rights to the relevant sections (by virtue of authority or capability) can interact, and while the next step the process can only be executed in sequence with the steps before and after, all may combine to give a self-contained, secure, distributed workflow engine, enacted by the document definition, which may provide for local access to data in a controlled manner.

Also, the network may provide a means to allow electronic informed consent comply with regulations where local copies of documents must be held at site in some jurisdictions. It can be used to determine the nodes and the people who have access and/or updated the document in any way. The following are example applications of the method and network of the present disclosure.

Example Application of the Technology: Process Management of a Clinical Trial

An Investigator at a clinical trial site may be dependent on getting the results of blood draws or biopsies before enrolling a patient into a trial to ensure that the patient meets the inclusion/exclusion criteria. The method described above helps to ensure that the Investigator has reviewed the report results from the screening laboratory.

The method provides, in one example application, for sending multiple thousands of documents to regulatory authorities each day; with confirmation that documents have been received/opened by the authorities and thereby triggering exception reporting if a document has not been received or opened.

Virtual Trials:

Ensuring and validating the origin of data coming from patients—for example remote signature, biometrics, or measurements taken at home The exemplary method and network allow improved decentralised data storage in a more general sense, enabling better adherence to privacy and GDPR requirements. The data stays where it is supposed to stay—and users can determine directly who has access to selected data in the relevant context of a process such as a clinical trial.

The present disclosure is not limited to the embodiments described but may be varied in construction and detail.

The invention claimed is:

1. A system for document access security management, comprising a plurality of nodes connected in a peer-to-peer network, each node of the plurality of nodes including a local store having instructions and a respective instance of a Finite State Machine (FSM) engine, and the local store of each node operatively connected to at least one processor configured to execute the instructions to perform operations that include:
    causing the node to act as a receiver and listen for smart documents directed to the node, wherein smart documents are a type of document that:
        are movable between a plurality of FSM states; and
        include access control data that define, for each of the plurality of FSM states, one or more of read, write, or access rights for each of various portions of document payload and maps users to portions of document payload authorized for one or more of reading, writing, or access;
    upon receiving a smart document from the peer-to-peer network, and prior to accessing a portion of the access control data:
        accessing a portion of the access control data of the received smart document corresponding to a current FSM state of the received smart document;
        for each portion of document payload of the received smart document, respectively and independently enabling or restricting one or more of read, write, or access rights as defined by the accessed portion of the access control data of the received smart document;
        receiving at least one interaction with one or more portion of the document payload for which the at least one interaction is enabled, and updating the one or more portion of the document payload of the smart document based on the at least one interaction, wherein updates are restricted from any portion of the smart document not authorized by the portion of the access control data corresponding to the current FSM state of the received smart document; and
        using the FSM in the local store to advance the received smart document to a next FSM state; and
    upon having a smart document in the local store that is in an FSM state that identifies at least one other node as a destination, causing the node to act as a sender and transmit the smart document across the peer-to-peer network.

2. The system of claim 1, wherein the access control data defines an order of access for a plurality of users, the order corresponding at least in part to the plurality of FSM states.

3. The system of claim 2, wherein the access control data includes access logs indicative of interactions of the plurality of users.

4. The system of claim 1, wherein each node is further configured to:
    encrypt the smart document prior to transmitting the smart document over the peer-to-peer network; and
    decrypt at least a portion of the smart document upon receiving the smart document from the peer-to-peer network.

5. The system of claim 4, wherein the enabling of interactions with the one or more portion of document payload of the received smart document corresponding to the current FSM is performed at document run time.

6. A method for document access security management executed by at least one processor, comprising:
    causing at least one node of a plurality of nodes connected in a peer-to-peer network to act as a receiver and listen for smart documents directed to the node, wherein:
        each node of the plurality of nodes includes a local store having instructions and a respective instance of a Finite State Machine (FSM) engine;
        the local store of each node is operatively connected to the at least one processor; and
        smart documents are a type of document that:
            are movable between a plurality of FSM states; and
            include access control data that define, for each of the plurality of FSM states, one or more of read, write, or access rights for each of various portions of document payload and maps users to portions of document payload authorized for one or more of reading, writing, or access;
    upon the node receiving a smart document from the peer-to-peer network, and prior to accessing a portion of the access control data, causing the node to:
        access a portion of the access control data of the received smart document corresponding to a current FSM state of the received smart document;
        for each portion of document payload of the received smart document, respectively and independently enable or restrict one or more of read, write, or access rights as defined by the accessed portion of the access control data of the received smart document;
        receive at least one interaction with one or more portion of the document payload for which the at least one interaction is enabled, and update the one or more portion of the document payload of the smart document based on the at least one interaction, wherein updates or alterations are restricted from any portion of the smart document not authorized by the portion of the access control data corresponding to the current FSM state of the received smart document, wherein updating or altering include (i) allowing a user to sign in one or more portions of the smart document, but make no other alterations or (ii) allowing a change to one or more portion of the smart document but not to other portions; and
        use the FSM in the local store to advance the received smart document to a next FSM state; and upon the node having a smart document in the local store that is in an FSM state that identifies at least one other node as a destination, causing the node to act as a sender and transmit the smart document across the peer-to-peer network.

7. The method of claim 6, wherein the access control data defines an order of access for a plurality of users, the order corresponding at least in part to the plurality of FSM states.

8. The method of claim 7, wherein the access control data includes access logs indicative of interactions of the plurality of users.

9. The method of claim 6, wherein each node is further configured to:
encrypt the smart document prior to transmitting the smart document over the peer-to-peer network; and
decrypt at least a portion of the smart document upon receiving the smart document from the peer-to-peer network.

10. The method of claim 9, wherein the enabling of interactions with the one or more portion of document payload of the received smart document corresponding to the current FSM is performed at document run time.

11. A non-transitory computer-readable storage medium comprising instructions that are executable by at least one processor to perform operations for document access security management that include:
causing at least one node of a plurality of nodes connected in a peer-to-peer network to act as a receiver and listen for smart documents directed to the node, wherein:
each node of the plurality of nodes includes a local store having instructions and a respective instance of a Finite State Machine (FSM) engine;
the local store of each node is operatively connected to the at least one processor; and
smart documents are, in each case, a single executable file that:
is movable between a plurality of FSM states;
includes access control data that define, for each of the plurality of FSM states, one or more of read, write, or access rights for each of various portions of document payload and maps users to portions of document payload authorized for one or more of reading, writing, or access; and
are executable to run FSM code that sets access permissions for various portions of document payload based on the access control data, and then causes an interface to output portions of the document payload according to the access control data;
upon the node receiving a smart document from the peer-to-peer network, and prior to accessing a portion of the access control data, causing the node to execute the received smart document to:
access a portion of the access control data of the received smart document corresponding to a current FSM state of the received smart document;
for each portion of document payload of the received smart document, respectively and independently enable or restrict one or more of read, write, or access rights as defined by the accessed portion of the access control data of the received smart document;
receive, via the interface, at least one interaction with one or more portion of the document payload for which the at least one interaction is enabled, and update the one or more portion of the document payload of the smart document based on the at least one interaction, wherein updates are restricted from any portion of the smart document not authorized by the portion of the access control data corresponding to the current FSM state of the received smart document; and
use the FSM in the local store to advance the received smart document to a next FSM state; and
upon the node having a smart document in the local store that is in an FSM state that identifies at least one other node as a destination, causing the node to act as a sender and transmit the smart document across the peer-to-peer network.

12. The non-transitory computer-readable storage medium of claim 11, wherein the access control data in smart documents further maps users to portions of document payload authorized for one or more of viewing or editing.

13. The non-transitory computer-readable storage medium of claim 12, wherein:
the access control data defines an order of access for the users, the order corresponding at least in part to the plurality of FSM states; and
the access control data includes access logs indicative of interactions of the plurality of users.

14. The non-transitory computer-readable storage medium of claim 11, wherein each node is further configured to:
encrypt the smart document prior to transmitting the smart document over the peer-to-peer network; and
decrypt at least a portion of the smart document upon receiving the smart document from the peer-to-peer network.

15. The non-transitory computer-readable storage medium of claim 14, wherein the enabling of interactions with the one or more portion of document payload of the received smart document corresponding to the current FSM is performed upon executing the received smart document.

* * * * *